(No Model.)

R. J. THOMPSON.
DOG ATTACHMENT FOR LOG CARS.

No. 416,128. Patented Nov. 26, 1889.

WITNESSES:
W. R. Davis
C. Sedgwick

INVENTOR:
R. J. Thompson
BY
Munn & Co.
ATTORNEYS.

UNITED STATES PATENT OFFICE.

ROBERT J. THOMPSON, OF GRANDIN, MISSOURI.

DOG ATTACHMENT FOR LOG-CARS.

SPECIFICATION forming part of Letters Patent No. 416,128, dated November 26, 1889.

Application filed May 29, 1889. Serial No. 312,582. (No model.)

*To all whom it may concern:*

Be it known that I, ROBERT J. THOMPSON, of Grandin, in the county of Carter and State of Missouri, have invented a new and Improved Dog Attachment for Log Cars, Wagons, &c., of which the following is a full, clear, and exact description.

My invention relates to an improved dog attachment for log cars, wagons, sleds of all descriptions, and log-decks in saw-mills, and has for its object to provide a simple device whereby the logs may be effectually retained in position upon the body of the car or wagon or other log carrier or holder and expeditiously released therefrom at the proper time.

The invention has for its further object to provide a series of dogs so arranged that the said dogs may be raised or lowered simultaneously, and wherein the dogs upon either side of the body may be manipulated independently.

The invention consists of the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1:
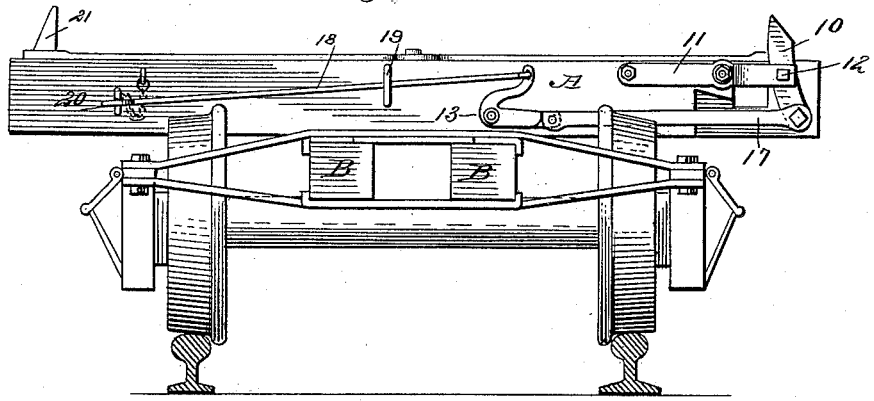
Figure 2:
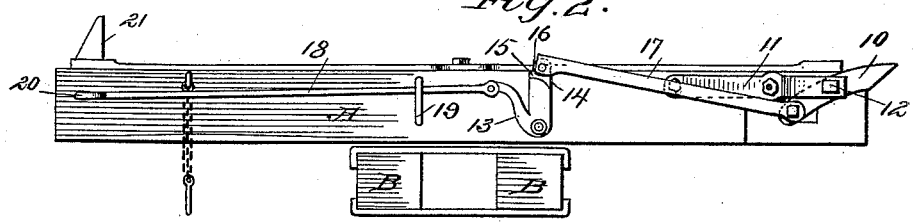
Figure 3:
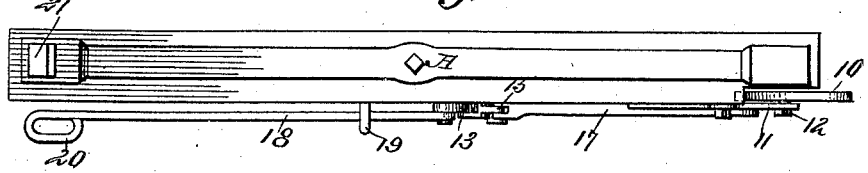
Figure 4:
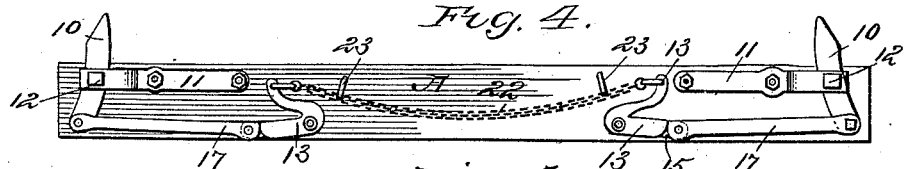
Figure 5:
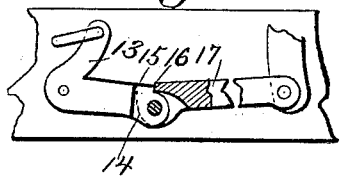

Figure 1 is an end view of a log-car having my improvement applied thereto, and illustrating the dog in position to retain the logs upon the car; also illustrating a pivoted dog at one end of the bolster and a rigid dog at the opposite end. Fig. 2 is a side elevation of the bolster illustrated in Fig. 1, showing a dog in position to admit of the dumping of the logs. Fig. 3 is a plan view of the device, a slightly-modified form of bracket being shown. Fig. 4 is a side elevation of a bolster, illustrating a pivoted dog applied to both ends thereof; and Fig. 5 is a detail view of the manipulating-lever and the link-connection between the said lever and dog.

A represents the bolster of a car, wagon, or other log carrier or holder, illustrated in the drawings as forming a portion of a car-truck and as secured to the reach-beams B thereof.

As the device is duplicated upon both the forward and the rear bolsters, I have shown its application to one bolster only.

In Fig. 1 the dog 10 is pivoted to the outer face of the bolster, near one end only, and the manner of pivoting the said dog consists of securing to the said outer face of the bolster an angle-bracket 11, the outer end of which is removed a slight distance from the contiguous face of the bolster, and a pivot-pin 12 is passed through the outer end of the bracket, through the dog at or near its center, and into the bolster. By forming the bracket in the manner shown one dog is forced outward to permit the logs to be rolled off, as illustrated in Fig. 2. The outward movement of the said dog, as shown in the drawings, is limited, as its lower end contacts with the under edge of bracket in order to form a skid to regulate the dropping of the log; but for or on log-decks or similar uses this movement would not be limited and the dog would be dropped entirely clear.

Upon one side of the center of the bolster A, upon the outer face of the same, an elbow or crank lever 13 is pivoted. The end of one member of the said lever is recessed upon both sides, as illustrated at 14 in Fig. 2, and likewise in Fig. 5, whereby a tongue 15 is formed of less thickness than the body of the lever, and one side edge of said tongue is cut away to form a shoulder 16. The base walls of the side recesses 14 of the lever are convex. The reduced end of the lever is connected with the lower extremity of the dog 10 by means of a link 17, one end of the said link being pivoted to the dog, and the other end is pivoted to the tongue of the angle or elbow lever 13. The inner side of the link, which is pivoted to the lever, is slotted upon its inner face to receive the tongue and provide a shoulder, as is shown in Fig. 5. By providing a rule-joint on this end between the elbow-lever and the link 17, when the member of the lever carrying the tongue and the link are brought downward slightly below a horizontal position, as illustrated in Fig. 1, the dog is forced to vertical position and the joint is locked. The elbow-lever, when one dog only is employed upon each bolster, is preferably manipulated through the medium of a rod 18, attached thereto, as shown in Figs. 1 and 2, which rod passes through suitable guides 19 to a point at or near the opposite end of the bolster and is made to terminate in a handle 20. When a single pivoted dog is employed upon each bolster at the opposite end, a fixed dog 21 is located. In manipulating the pivoted dog, when the rod 18 is pulled outward, the member of the elbow-lever carrying the tongue is brought to a vertical position, whereby the link is borne forward and the dog depressed. When the dog is in this position, the logs may be readily rolled off, or if the car or other carriage is standing on an incline the logs roll off by gravitation and unloading is greatly facilitated. By pushing the rod 18 inward the member of the elbow-lever pivoted to the link and likewise the link are forced to the position shown in Fig. 1, and the lower end of the dog is forced outward, whereby the latter is carried to the vertical position and locked in such position, effectually holding the logs upon the carriage in place.

In Fig. 4 I have illustrated a pivoted dog located at each end of the bolster. The elbow-lever of each of the dogs is connected by a chain or rope 22, upon which chain or rope, near each lever, I usually provide a ring 23, whereby either of the dogs may be manipulated independently. By drawing downward upon the rope or chain 22 at the center both dogs are simultaneously carried downward to the open position; but if the ring to the right is drawn upon, the left-hand dog only will be thrown down, or vice versa. When a chain is employed, as shown in Fig. 4, the dogs are forced to a locked or vertical position by bearing against their outer edges or by pressing down the links 17.

This invention is equally applicable to the frames of trucks or wagons carrying round packages—such as barrels, casks, &c.—and will effectually retain the load upon the vehicle and admit of the convenient and expeditious discharge therefrom.

Having thus described my invention, I claim as new and desire to secure by Letters Patent—

1. The combination, with the bed of a vehicle, of a dog pivoted thereto, an operating-lever, and a link pivoted to the said dog and attached to said lever by means of a rule-joint, substantially as shown and described.

2. The combination, with the bed of a vehicle, of a dog pivoted thereto, an elbow-lever, a link pivoted to the elbow-lever and to the dog, and means for operating the said elbow-lever, substantially as described.

3. The combination, with a bolster or cross-beam of a log carrier or holder or other vehicle, of a dog pivoted thereto extending above the same, an elbow-lever, a link pivoted to the dog and connected to one member of the said lever by a rule-joint, and means, substantially as shown and described, for manipulating the lever, as and for the purpose specified.

4. The combination, with the bolster or cross-beam of a log carrier or holder or other vehicle, of a bracket secured thereto having one outwardly-curved end, a dog pivoted between the curved end of the bracket and the bolster, an elbow-lever, a link pivoted to the dog and connected with one member of the elbow-lever by a rule-joint, and means, substantially as shown and described, for manipulating the lever, as specified.

ROBERT J. THOMPSON.

Witnesses:
WM. H. CATERN,
GEO. K. SMITH.